United States Patent Office 3,090,601
Patented May 21, 1963

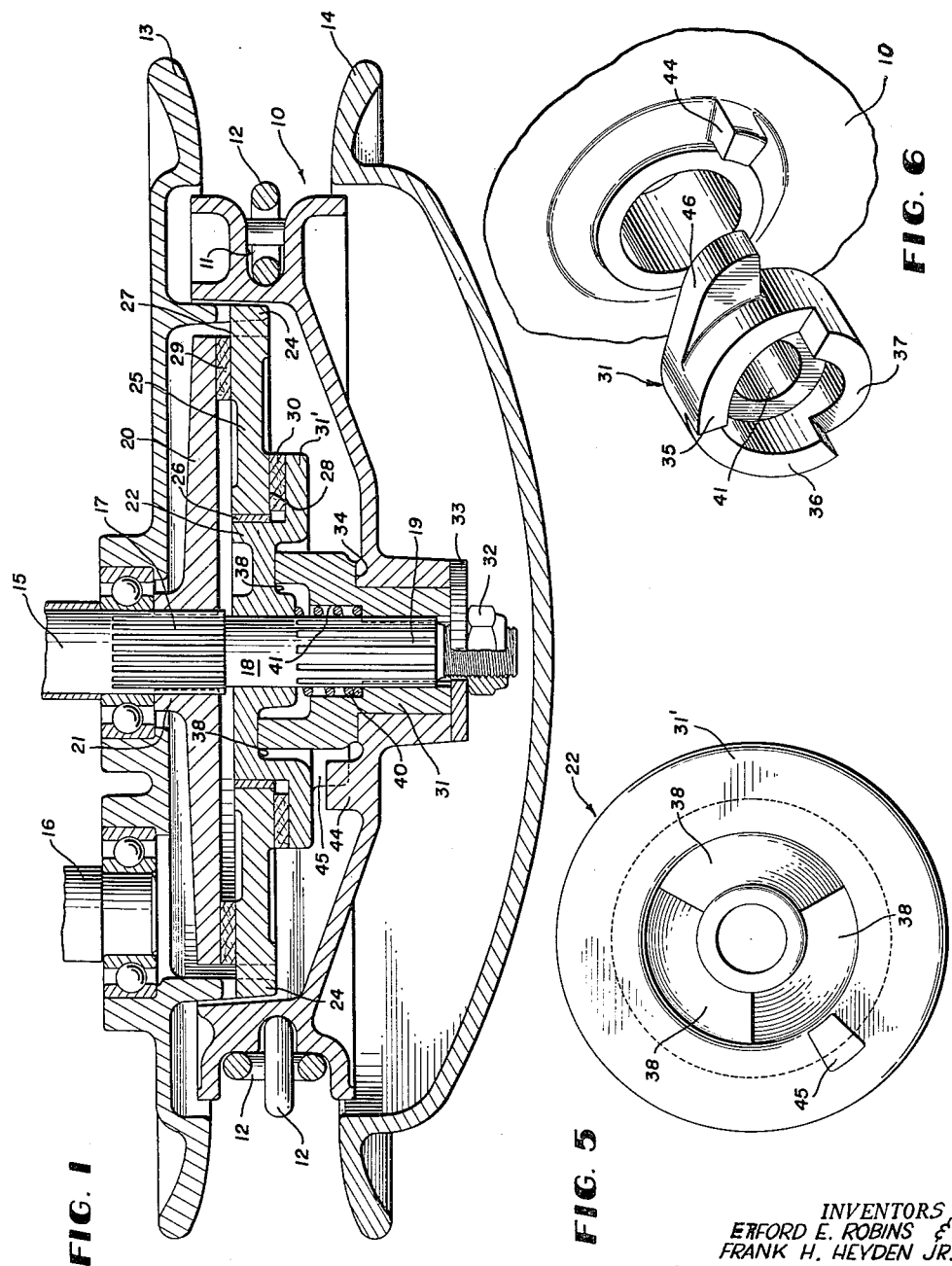

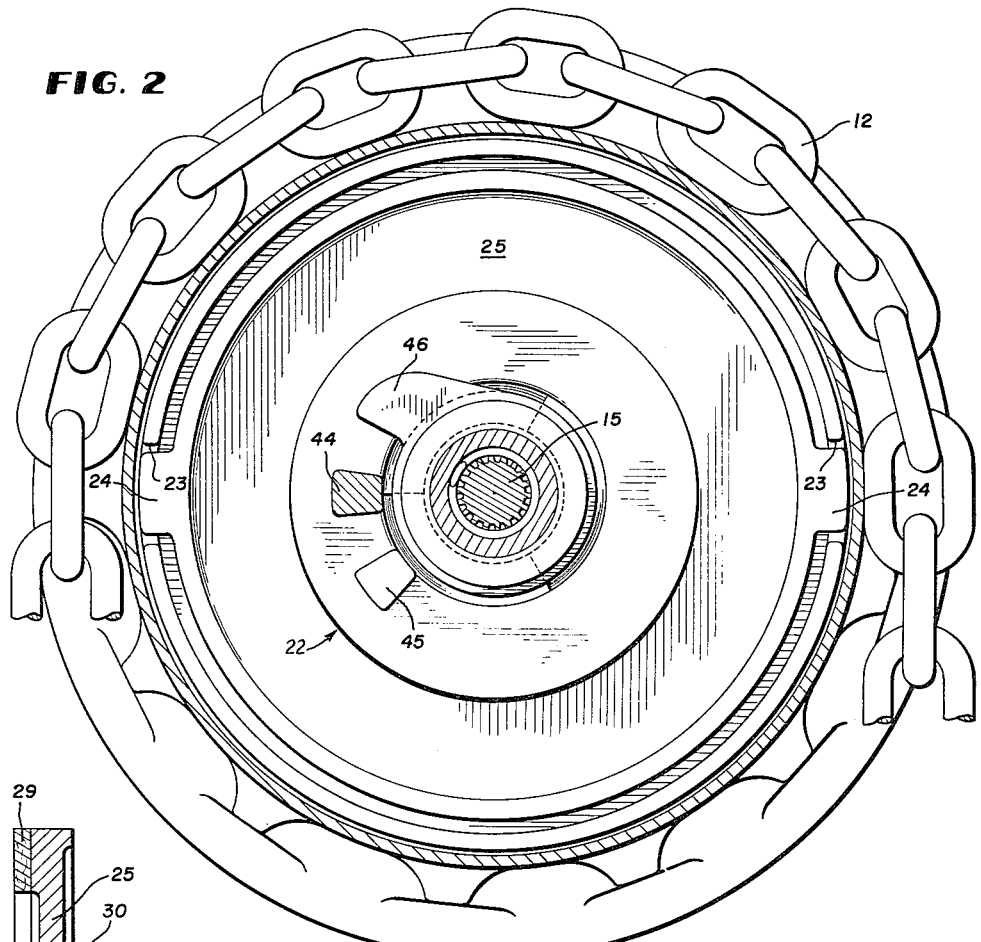
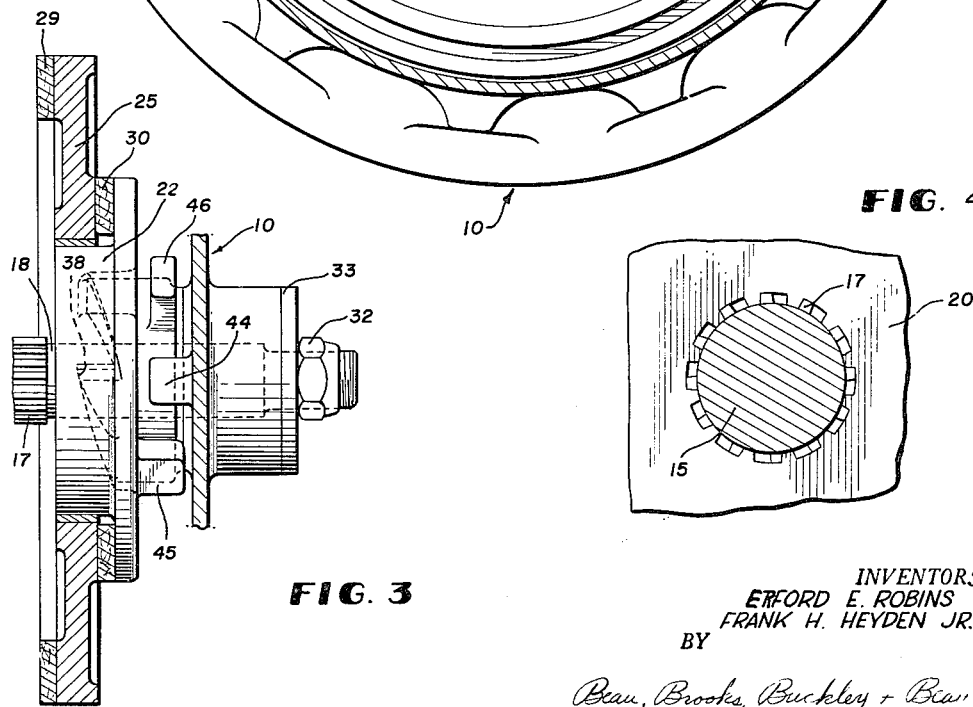

3,090,601
HOIST BRAKE
Erford E. Robins, North Tonawanda, N.Y., and Frank H. Heyden, Jr., Charlotte, N.C., assignors to Columbus McKinnon Corporation, Tonawanda, N.Y.
Filed Nov. 29, 1960, Ser. No. 72,361
4 Claims. (Cl. 254—169)

This invention relates to hoisting mechanisms and pertains more particularly to improvements in such mechanisms relating to the manner in which the load is arrested and held stationary as the same is being lowered upon cessation of lowering motion imparted by the operator.

In hoist mechanisms of the general type to which the present invention is directed, there is provided a hand operated wheel, normally associated with a loop of chain by means of which the wheel is rotated in either direction, and a power shaft to which the wheel is connected by suitable gearing or the like so as to obtain a mechanical advantage therebetween, the load being raised and lowered by the power shaft in accordance with the direction of rotation of the handwheel. Means must be provided to brake and to hold the mechanism to prevent the load from lowering under the influence of its own weight and this is usually accomplished by means of a pawl and ratchet device. However, such load holding devices are subject to certain disadvantages, predominant among which is the relatively high cost of manufacture, the noise level during operation and the ever present danger that the pawl and ratchet may malfunction and allow the load to drop uncontrolled. It is, therefore, of primary concern in connection with the present invention to provide certain improvements in the braking mechanism of hoists which will eliminate the aforesaid disadvantages.

More particularly, it is an object of the present invention to provide an improved hoist in which the load is held stationary by means of a friction brake device at all times that the hoist is not under the manual control of the operator. The friction brake is, at the same time, of such efficient construction that it requires relatively few component parts to obtain the requisite braking action in reliable and economical fashion. At the same time, the utilization of friction brake means insures quiet operation and is at all times positive in its action.

With the above, and other objects in view that will hereinafter appear, the nature of the invention will be more clearly understood by reference to the following detailed description, the appended claims and the several views illustrated in the accompanying drawing.

In the drawing:

FIG. 1 is a horizontal section taken through a portion of a hoist, showing the brake mechanism and its relation to the handwheel;

FIG. 2 is a vertical section taken through the handwheel and illustrating the relationship between the abutment means for effecting the raising and lowering of the load;

FIG. 3 is an elevational view, partly in section, showing the cam device and the abutment means;

FIG. 4 is an enlarged section showing the lost motion connection between the brake plate and the handwheel shaft;

FIG. 5 is an elevational view of the cam plate; and

FIG. 6 is an exploded perspective showing the inner face of the handwheel and the cam element.

Referring now more particularly to FIG. 1, the mechanism shown therein is a portion of a hoist assembly constructed in accordance with the present invention, and will be seen to include a handwheel indicated generally by the reference character 10. In accordance with standard practice, this handwheel is provided around its circumference with a series of pockets 11 which successively receive adjacent links 12 of the load lifting and load lowering chain. As is also usual, such chain is in the form of an enlarged loop trained over the handwheel so that the operator may pull down on one side or the other of this chain to rotate the handwheel in either desired direction.

Parts 13 and 14 are portions of the housing or frame of the hoist, and are fixed elements. The frame journals a pair of shafts 15 and 16, the former of which will be referred to hereinafter as the handwheel shaft and the latter of which will be referred to as the hoisting and lowering or power shaft. These two shafts are interconnected by gear reduction mechanism, not shown, which is, in itself, of conventional and well known design and which forms no part of the present invention. For the purpose of understanding the present invention, it is sufficient to state that the gear reduction is such as to establish a mechanical advantage of the shaft 15 over shaft 16 of such nature as will permit the operator to raise those loads up to and including the rated maximum capacity of the hoist.

Shaft 15 is provided with splines 17, beyond which is a reduced portion 18 having further splines 19. A friction plate 20 having an internally splined hub 21 is mounted on the splined portion 17 of shaft 15 and, for a purpose hereinafter specified, the fit between the splines 17 and the splines in hub 21 is such as to permit of limited rotation between the friction plate 20 and shaft 15, see FIG. 4. The function of the splines on the shafts 15 and plate 20 may be attained by other means such as a pin extending through the shaft 15 and into an over-sized slot in the plate 20.

A cam plate 22 is mounted on the reduced portion 18 of shaft 15, having a hub rotatably receiving the shaft for this purpose. The cam plate is free to rotate and/or move axially on shaft 15 under certain conditions described hereinafter. The housing or frame portion 13 is provided with one or more slots or notches 23 receiving lugs 24 projecting radially from brake plate 25 so that the brake plate is fixed against rotation relative to the frame while at the same time, such plate may move axially relative to shaft 15, the purpose of which will also be apparent presently.

As can be seen best in FIG. 1, the brake plate 25 surrounds the cam plate 22 and is journaled thereon by means of a bushing 26 fitted within the central opening of the brake plate. The brake plate has friction surfaces 27 and 28 on its opposite faces and preferably disposed adjacent the outer and inner edges of this plate respectively. These friction surfaces are adapted to be engaged by brake lining annuluses 29 and 30 carried by the friction plate 20 and the cam plate 22 respectively. Lining 29 is fixed to that face of the friction plate 20 opposed to the brake plate and lining 30 is fixed to an offset flange 31' on the cam plate, as is shown in FIG. 1.

Since the brake plate is fixed relative to the frame, whereas the friction plate is fixed to the shaft 15, it will be apparent that at any time that the two plates 20 and 22 are urged toward each other so as to sandwich the brake plate between them, shaft 15 will be effectively fixed to the frame to prevent rotation of both the handwheel shaft and the power shaft. Consequently, under such conditions, any load engaged by the hoist will remain in fixed position.

A cam member 31 is fixed to the splined end 19 of shaft 15 by reason of internal splines formed in such member and the cam member also forms a journal for the handwheel as is evident from FIG. 1. The extremity of shaft 15 is threaded, receiving a nut 32 thereon which, through the intermediary of washer 33 axially locates the handwheel 10. In regard to this, it is to be noted that the cam 31 is stepped to provide a shoulder 34 (FIG. 1)

which, together with the washer 33 fixes the handwheel axially on the cam while at the same time, there is sufficient end play as to allow the handwheel to rotate freely on the cam.

As can be seen best in FIG. 6, the end of cam 31 adjacent cam plate 22 is provided with a series of cam teeth 35, 36 and 37 whose end edges describe helical, interrupted cam faces which mesh with similarly formed recesses 38 on that side face of cam plate 22 adjacent the cam, see particularly FIGS. 3 and 5.

Acting between and normally urging apart the members 22 and 31 is a compression spring 40 housed at least partly in a counterbore 41 in the cam 31. The purpose of this spring is to assure at all times that the several elements 20, 22 and 25 are in frictional contact, although it will be understood that such frictional engagement is not such as will create an objectionable drag resisting rotation of the handwheel. However, the spring must assure the stated frictional interengagement of the elements as described.

Abutment means is provided for permitting of hoisting and lowering operations. This means is in the form of lugs 44, 45 and 46, carried respectively by members 10, 22 and 31. In one direction of rotation of the handwheel 10, the abutment members 44 and 46 will engage while on reverse rotation of the handwheel, abutment members 44 and 45 will interengage.

Referring to FIG. 2, it will be seen that clockwise rotation of the handwheel 10 will cause the lug 44, rigid with this member, to engage lug 46 on the cam member 31. Since cam member 31 is fixed to shaft 15, this action will directly couple the handwheel to the handwheel shaft 15 and the hoist will correspondingly be operated in load raising fashion. When the operator releases the chain or otherwise ceases load raising manipulation, the brake will automatically operate. This is accomplished by reason of the fact that when the handwheel ceases to be turned, the weight of the load will first impart a reverse (counterclockwise in FIG. 2) rotation to shaft 15. This reverse action is only momentary and relatively slight and will be accomplished without imparting any reverse motion to the friction plate 20, due to the lost motion connection between the friction plate and shaft 15 as set forth hereinbefore. During the time that this reverse motion is taking place, the several elements 20, 22 and 25 will remain stationary because they are in frictional engagement and because the element 25 is rigid with the frame. Consequently, the reversing motion of shaft 15 will effect relative rotation between elements 22 and 31, that is, between the cam and the cam plate. This will axially move the came plate and the brake plate toward the friction plate so that these three elements will tightly interlock. It will be realized that as the cam and cam plate rotate relative to each other, increasing pressure will be generated between the three elements 20, 25 and 22, until a frictional holding torque equal to or a little greater than the torque input to shaft 15, resulting from the weight of the load, is achieved.

When it is desired to lower the load, the operator manipulates the handchain so as to rotate the handwheel in counterclockwise direction, engaging lug 44 against lug 45 on the cam plate. Due to the fact that lug 44 is much closer to the axis of rotation of the handwheel than is the point of torque application imparted thereto by the handchain, the operator has considerable mechanical advantage over the holding torque on the elements 20, 25 and 22 and easily causes the cam plate 22 to slip relative to the brake plate 25. This results in relative rotation between the cam and cam plate, such as to lessen the sandwiching action on the brake plate. Such relative rotation will occur to an extent proportional to the pull exerted on the handchain to establish, for such pull, an equilibrium condition causing greater or lesser lowering speed of the load in accordance with greater or lesser pull on the handchain. That is to say, the load actually lowers itself, the operator merely increasing or decreasing the holding torque of the brake means in accordance with the amount of pull exerted on the handchain.

The lost motion connection between the friction plate and the handwheel shaft is illustrated in FIG. 4. It will be appreciated that a relatively slight movement between these two elements is sufficient to permit of the proper operation.

In addition to the advantages enumerated above, another desirable feature is that the friction surfaces 27 and 28 of the brake plate will be kept free of contamination and corrosion by virtue of the fact that these surfaces are constantly in contact with the brake linings so as to be protected thereby.

What is claimed is:

1. In combination with a hoisting device including a frame and a handwheel shaft responsive to rotation in opposite directions to lower or hoist a load, a cam fixed to said shaft, a handwheel rotatably mounted on said cam and including abutment means engageable with the cam for directly connecting the handwheel to the shaft for hoisting a load, a cam plate rotatably mounted on the shaft adjacent the cam with such two elements having cooperable cam surfaces effective to shift the cam plate axially of the shaft away from the cam in response to relative rotation between the cam and cam plate, a brake plate carried by said frame in surrounding relation to said shaft and fixing the same against rotation relative to the shaft while permitting of axial movement relative thereto, a friction plate, lost motion means fixing said friction plate to said shaft for limited rotation only relative thereto, said friction plate being disposed on that side of the brake plate remote from the cam plate, spring means operating between the cam and cam plate constantly urging the cam plate against the brake plate to lightly effect sandwiching of the brake plate between the friction and cam plates, said abutment means on the handwheel being engageable with said cam plate in the direction of rotation thereof corresponding to load lowering to rotate the cam plate relative to the cam and thereby release the brake plate from braked engagement by said friction and cam plates.

2. In a hoisting mechanism including a frame and a shaft journaled in said frame for hoisting a load in response to rotation in one direction and for lowering a load in the opposite direction of rotation, a cam fixed to said shaft and a cam plate journaled on said shaft immediately adjacent said cam with the cam and cam plate being provided with cooperable cam surfaces for effecting axial displacement of the cam plate in response to relative rotational movement between the cam and cam plate, a brake plate carried by the frame adjacent said cam plate fixed against rotational movement relative to said shaft but movable axially thereof, a friction plate disposed adjacent said brake plate on that side thereof remote from said cam plate, means mounting said friction plate on said shaft for limited rotation relative thereto, actuating means rotatably mounted on said shaft including abutment means engageable in one direction of rotation of the actuating means to effect load hoisting rotation of said shaft and engageable with said cam plate in the opposite direction of rotation of the actuating means to effect load lowering rotation of said shaft, and spring means normally urging said cam plate toward and into contact with said brake plate so that relative rotation between said cam and cam plate, and consequent frictional sandwiching of the brake plate between the friction and cam plates, will occur under the influence of load weight when said actuating means is not urging said cam plate in said other direction of rotation.

3. In combination with a hoist mechanism having a frame, a power shaft rotatably mounted in said frame for load hoisting and load lowering operations in response to reverse rotations of said shaft; actuating means rotatably mounted on said shaft, a friction plate, lost motion means fixing said friction plate to said shaft for limited rotation relative thereto, a brake plate fixed to said frame against rotation relative thereto but movable axially of said shaft for movement into and out of braked engagement with said friction plate, a pair of cam elements having cooperable cam surfaces for effecting axial displacement between the cam elements in response to relative rotation therebetween, one cam element being fixed to said shaft and the other being rotatable and axially movable relative thereto, said other cam element having a portion frictionally engaged with said brake plate to urge the same against the friction plate upon axial displacement of said other cam element away from said one cam element, said actuating means having abutment means thereon for rotating said shaft in unison therewith in the direction of rotation of the actuating means corresponding to load raising to initially release the braked engagement through the medium of relative rotation between the cam elements as permitted by said lost motion means so as to thereafter permit load raising, said abutment means being engageable with said other cam element in the direction of rotation of the actuating means corresponding to load lowering to release the braked engagement and permit load lowering.

4. In combination with a hoist mechanism having a frame, a power shaft rotatably mounted in said frame for load hoisting and load lowering operations in response to reverse rotations of said shaft; actuating means rotatably mounted on said shaft, brake means for normally preventing load-induced load lowering, said brake means including a pair of cam elements having cooperable cam surfaces for effecting axial displacement between the cam elements in response to relative rotation therebetween, said actuating means including abutment means engageable with one cam element in the direction of actuating means rotation corresponding to load raising and with the other cam element in the opposite direction of rotation to, in each case, release said brake means, and means normally effecting a predetermined amount of braking effort by said brake means.

References Cited in the file of this patent

UNITED STATES PATENTS

| | | |
|---|---|---|
| 882,262 | Moore | Mar. 17, 1908 |
| 1,686,496 | Norton | Oct. 2, 1928 |
| 2,256,296 | Smith | Sept. 16, 1941 |
| 2,637,524 | Huvendick et al. | May 5, 1953 |